July 18, 1933.  G. A. LEY  1,919,114
LAMP STAND
Filed July 7, 1931
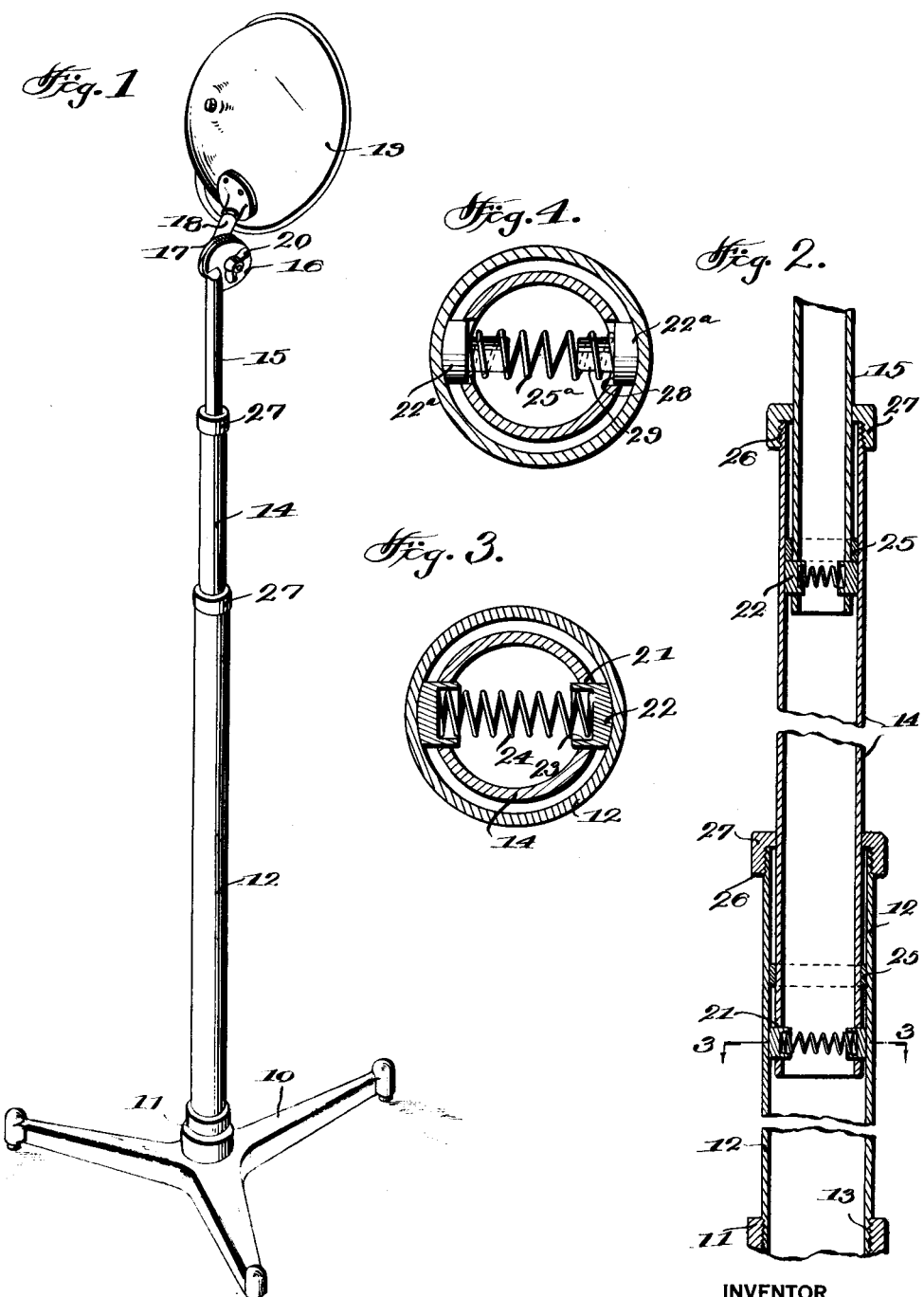
WITNESS
J. Markey
INVENTOR
G. A. Ley
BY
ATTORNEY Patented July 18, 1933

1,919,114

UNITED STATES PATENT OFFICE

GEORGE ALBERT LEY, OF CHICAGO, ILLINOIS

LAMP STAND

Application filed July 7, 1931. Serial No. 549,296.

My invention relates to stands for support of photographic apparatus, such as lamps, reflectors, screens or the like, and it consists in the constructions, arrangements and combinations herein described and claimed.

It is an object of the invention to provide a support employing a telescopic standard which is quickly adjustable to position the device to be supported at the desired height, without the necessity of manipulating adjusting screws or other fastening means.

It is a further object of the invention to provide a supporting standard in which a plurality of telescopic sections are involved, each section employing a friction clutch means for positively gripping the internal wall of an associated telescopic section.

A still further object of the invention is to provide a stop means cooperable between respective telescopic sections and the clutch, preventing undue extension of the sections.

Additional objects, advantages and features of invention will be apparent from the following description and accompanying drawing, wherein:

Figure 1 is a perspective view of a stand constructed in accordance with my invention;

Figure 2 is a vertical section through a portion of the telescopic sections, illustrating my clutch members;

Figure 3 is a cross section on the line 3—3 of Figure 2;

Figure 4 is a similar view, illustrating a modified form of clutch member.

In carrying out my invention I employ a base 10 which may be of any desirable construction, but preferably includes a central stud 11, within which a vertical hollow standard 12 is secured. The standard 12 may be screw threaded within the stud 11, as shown at 13, or may be welded thereto or otherwise fastened.

The standard 12 is of a diameter to slidably receive a standard 14, the latter of which slidably supports a standard 15. Thus it is seen that the standards are telescopically arranged, and any number of standards may be employed in this manner, to produce a support meeting the requirements of a particular work to be carried out.

The standard 15 terminates at its upper end in a head 16 which cooperates with a head 17 carried by the stud 18 of the lamp 19, the head members being secured adjustably by a set screw 20. It will be understood that some other device than a lamp may be supported, such for instance as a reflector, screen or the like.

Reference is now made to Figure 2 for an understanding of the clutch means employed between the telescoping sections for maintaining adjusted positions. The standards 14 and 15 are provided adjacent their lower portions with diametrically opposed apertures 21, in each of which there is slidably mounted brake shoes 22. The outer surfaces of these shoes are shaped to conform to the inner contour of the standards so as to afford substantial gripping surfaces therebetween. The shoes 22 are centrally recessed, as at 23, forming seats for a coil spring 24. As clearly seen in Figure 3, the ends of the spring 24 seat within respective recesses of the shoes and exert an outward pressure thereupon so as to engage the walls of a standard associated therewith.

In order to prevent excessive outward movement of the standards 14 and 15, a stop means 25 is provided in standards 12 and 14, these stops being positioned adjacent the upper ends of the standards. The stops 25, in the present instance, are formed as ring members having an outer diameter to frictionally bind within its associated standard and having its inner diameter of a size to permit free sliding movement of its telescopic standard. In addition to acting as a stop means, the rings 25 also afford support of the telescoping standards against wobbling or other loose movements.

The upper ends of the standards 12 and 14 are provided with exterior screw threads, as at 26, and receive thereon screw threaded cap members 27. The cap members 27 are, of course, centrally apertured to receive the telescoping standards 14 and 15.

In assembling the standards, the telescoping section 14 with its associated clutch is inserted in the standard 12. The ring 25 is then forced into the hollow standard 12 to any suitable point below the upper end thereof, and finally the cap 27 is adjusted in position upon the screw threads 26. The remaining sections are similarly assembled.

In Figure 4, I have illustrated a modified form of brake shoes, and in this form, the shoes are provided with shoulders 28 and stem members 29. The ends of the spring 25ª encircle the stem members 29 and rest against the shoulders 28. Thus, it will be seen that the spring 25ª forces the brake shoes 22ª into engagement with the wall of a standard.

In the use of my device, when it is desired to extend the sections, it is only necessary to exert an outward pull upon the sections. The resilient mounting of the brake shoes 22 will permit a sliding movement of the telescoping sections, and as soon as the sections have been extended to the height desired, cessation of the outward pull thereon permits the springs 24 to force the brake shoes into binding engagement with its associated standard. The downward movement of the standards will likewise permit relative sliding movement between the shoes and associated standard.

While I have shown the standards as cylindrical, it should be understood that the shape is immaterial, as my clutch will operate equally effective with square or other angular tubing.

From the foregoing it will be seen that I have provided a support which may be adjusted to various heights, without the need of adjusting screws or like fastening means.

I claim:

In an adjustable stand, a hollow standard, a one-piece continuous standard slidable therewithin, said slidable standard having alined apertures, a friction shoe fitting and mounted in each aperture and movable therethrough, each of said shoes having a spring seat disposed in opposed relation to the other and a helical spring positioned between said shoes and retained within said seats for forcing said shoes into contact with said hollow standard.

GEORGE ALBERT LEY.